US009220155B2

(12) United States Patent
Chang et al.

(10) Patent No.: US 9,220,155 B2
(45) Date of Patent: Dec. 22, 2015

(54) LAMP AND SWITCH APPARATUS THEREOF

(71) Applicants: Ling Chang, Shenzhen (CN);
Quan-Quan Liu, Shenzhen (CN);
Li-Zhang Huang, New Taipei (TW);
Han-Che Wang, New Taipei (TW);
Kuan-Hong Hsieh, New Taipei (TW);
Xiao-Guang Li, Shenzhen (CN)

(72) Inventors: Ling Chang, Shenzhen (CN);
Quan-Quan Liu, Shenzhen (CN);
Li-Zhang Huang, New Taipei (TW);
Han-Che Wang, New Taipei (TW);
Kuan-Hong Hsieh, New Taipei (TW);
Xiao-Guang Li, Shenzhen (CN)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 467 days.

(21) Appl. No.: 13/663,495

(22) Filed: Oct. 30, 2012

(65) Prior Publication Data
US 2013/0221853 A1 Aug. 29, 2013

(30) Foreign Application Priority Data

Feb. 23, 2012 (CN) .......................... 2012 1 0041834

(51) Int. Cl.
*H05B 39/00* (2006.01)
*H05B 37/02* (2006.01)
*H05B 39/08* (2006.01)

(52) U.S. Cl.
CPC .......... *H05B 37/0227* (2013.01); *H05B 39/085* (2013.01)

(58) Field of Classification Search
CPC .......................... H05B 37/0227; H05B 39/085
See application file for complete search history.

(56) References Cited

U.S. PATENT DOCUMENTS

| 7,608,948 | B2 * | 10/2009 | Nearhoof et al. | 307/140 |
| 7,760,107 | B1 * | 7/2010 | Stepps et al. | 340/815.45 |
| 2006/0268528 | A1 * | 11/2006 | Zadesky et al. | 361/728 |
| 2010/0079083 | A1 * | 4/2010 | Seguine | 315/292 |
| 2010/0127638 | A1 * | 5/2010 | Lan et al. | 315/294 |
| 2012/0268025 | A1 | 10/2012 | Chi et al. | |
| 2013/0070158 | A1 | 3/2013 | Hsieh et al. | |
| 2014/0022390 | A1 * | 1/2014 | Blank et al. | 348/148 |

FOREIGN PATENT DOCUMENTS

| CN | 102159013 | 8/2011 |
| CN | 102289324 | 12/2011 |

* cited by examiner

*Primary Examiner* — Jung Kim
(74) *Attorney, Agent, or Firm* — Novak Druce Connolly Bove + Quigg LLP

(57) ABSTRACT

A lamp includes a lamp body, an LED light source, a storage unit, a switch apparatus, and a microprocessor. The storage unit stores a function table recording a relationship between a plurality of types of touches and a plurality of control functions. The switch apparatus includes a touch panel, a touch controller, and an indicator located under the first touch region. The touch panel generates signals in response to touches applied on thereon. The touch panel includes a first touch region and a second touch region. The touch controller receives the signals and determines the type of the touch intended. The microprocessor refers to the function table, and controls the LED light source to execute the control function and to give visual feedback when the touch panel is touched. A switch apparatus is also provided.

14 Claims, 5 Drawing Sheets

| Touch Manner | Touch Position | Control Function |
|---|---|---|
| Tap | The first touch region | Switch between the power on and power off states of the LED light source |
| | On one of the stall marks indicating the color temperature on the second touch region | Adjust the value of the color temperature of the LED light source to the value of the color temperature associated with the clicked stall mark |
| Sliding Clockwise | The second touch region | Increase the brightness of the LED light source |
| Sliding Counterclockwise | The second touch region | Decrease the brightness of the LED light source |

12

| Touch Manner | Touch Position | Control Function |
|---|---|---|
| Tap | The first touch region | Switch between the power on and power off states of the LED light source |
| | On one of the stall marks indicating the color temperature on the second touch region | Adjust the value of the color temperature of the LED light source to the value of the color temperature associated with the clicked stall mark |
| Sliding Clockwise | The second touch region | Increase the brightness of the LED light source |
| Sliding Counterclockwise | The second touch region | Decrease the brightness of the LED light source |

FIG. 4

| Touch Manner | Touch Position | Control Function |
|---|---|---|
| Tap | The first touch region | Switch between the power on and power off states of the LED light source |
|  | On one of the stall marks indicating the brightness on the second touch region | Adjust the value of the brightness of the LED light source to the value of the brightness associated with the clicked stall mark |
| Sliding Clockwise | The second touch region | Increase the color temperature of the LED light source |
| Sliding Counterclockwise | The second touch region | Decrease the color temperature of the LED light source |

FIG. 5

LAMP AND SWITCH APPARATUS THEREOF

BACKGROUND

1. Technical Field

The present disclosure relates to lamps and switches thereof, and particularly, to a lamp and a touch switch apparatus thereof.

2. Description of Related Art

Key and button switches may be used for powering on/off and/or adjusting functions of the lamps such as table lamps, fluorescent lamps, and tube lamps. For example, the user can select a key of the key switch to adjust the brightness of the lamp, or rotate the button of the button switch to adjust the brightness of the lamp. However, such a switch may be damaged due to fatigue after repeated use, thus the reliability of the switch and therefore the lamp decreases with use. Furthermore, the conventional switch input manner is tedious and boring, which is not user-friendly enough.

Therefore, what is needed is a lamp and a switch apparatus thereof to alleviate the limitations described above.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding sections throughout the several views.

FIG. 4 is a function table stored in the storage unit of the lamp of FIG. 1, recording a relationship between a number of touch manners, a number of touch positions, and a number of control functions of the lamp, in accordance with a first exemplary embodiment.

FIG. 5 is a function table stored in the storage unit of the lamp of FIG. 1, recording a relationship between a number of touch manners, a number of touch positions, and a number of control functions of the lamp, in accordance with a second exemplary embodiment.

DETAILED DESCRIPTION

Figure 1:
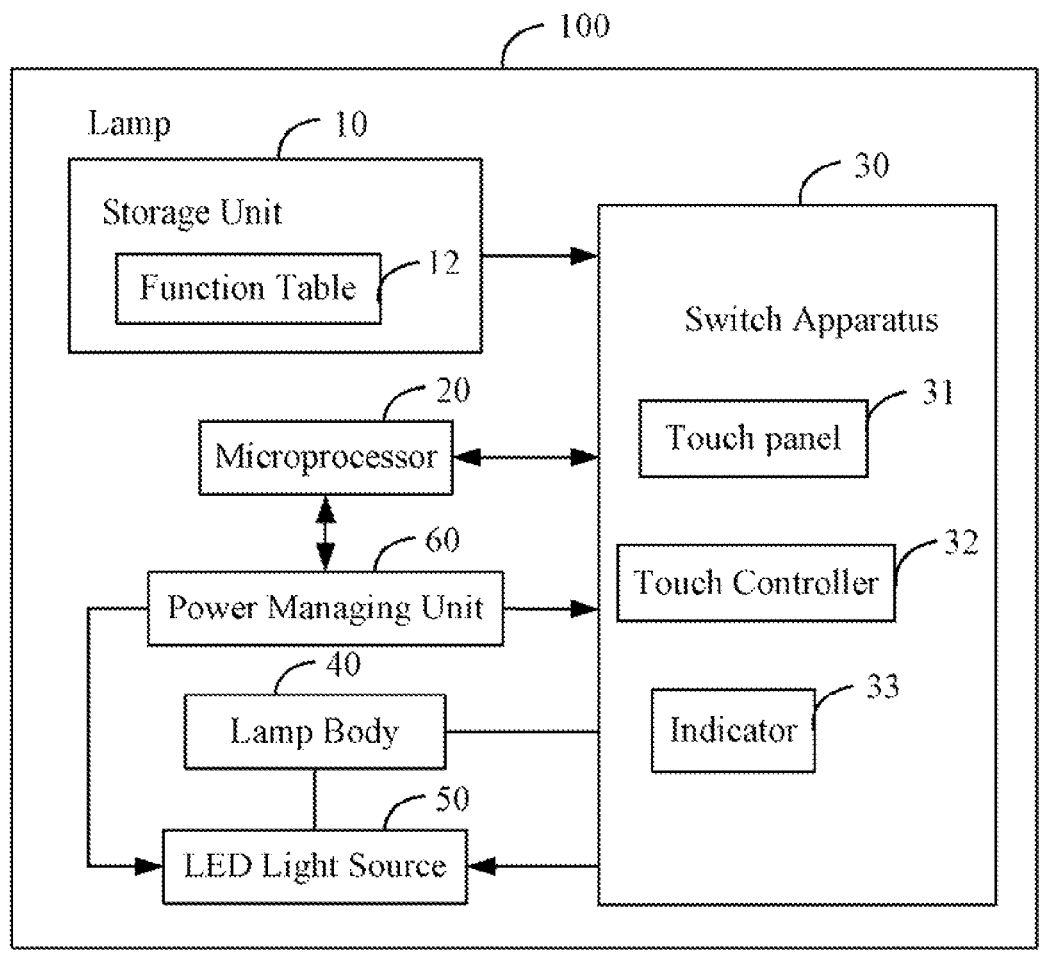
FIG. 1 is a block diagram of a lamp in accordance with an exemplary embodiment.

Referring to FIG. 1, a block diagram of a lamp 100 is disclosed as an exemplary embodiment. The lamp 100 includes a storage unit 10, a microprocessor 20, a switch apparatus 30 electrically connected to the microprocessor 20, and a power managing unit 60 for supplying power to the lamp 100. The lamp 100 is an light emitting diode (LED) table lamp equipped with the switch apparatus 30. In other embodiments, the lamp 100 can be a fluorescent lamp, or a tube lamp. The switch apparatuses of various types of lamps can control various functions. Various changes or modifications may be made to the embodiments without departing from the scope and spirit of the disclosure.

The storage unit 10 stores a function table 12 recording the relationship between a number of types of touches and a number of control functions of the lamp 100. In the embodiment, each type of touch includes the manner of touch and the location of the touch. The touches of a user may be applied to the switch apparatus 30. The microprocessor 20 confirms the control function according the user's touch and the function table 12 stored in the storage unit 10, and controls the lamp 100 to execute the control function. The user can control the lamp 100 by manipulating the switch apparatus 30.

Figure 2:
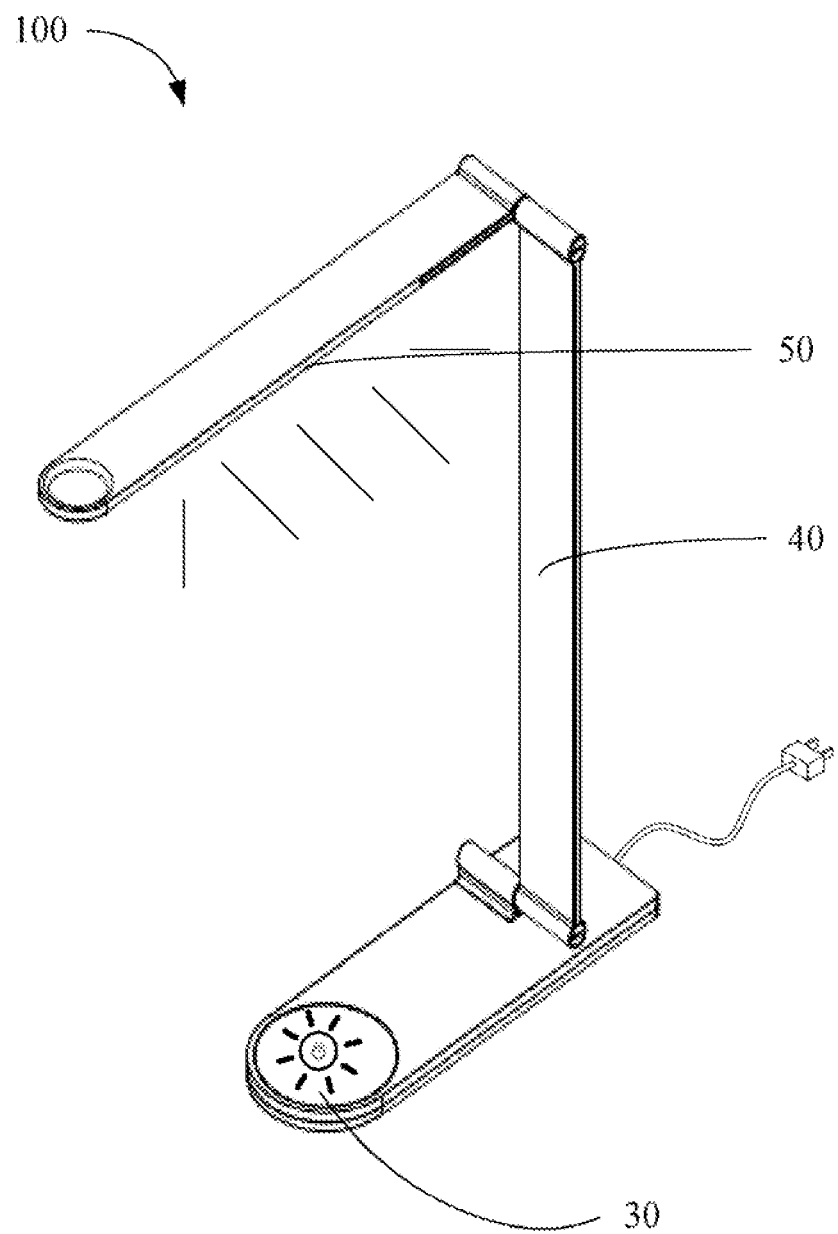
FIG. 2 is an isometric view of the lamp of FIG. 1, in accordance with the exemplary embodiments.

Referring to FIG. 2, an exemplary embodiment of the lamp 100 is an LED lamp, the LED lamp 100 includes a lamp body 40, an LED light source 50 fixed in the lamp body 40, and a switch apparatus 30. The user can control the power supplied to the LED light source 50, and adjust the brightness and the color temperature of the LED light source 50.

Referring to FIG. 1, the switch apparatus 30 includes a touch panel 31 and a touch controller 32. The touch panel 31 is circular and generates signals in response to touches applied thereon. The touch controller 32 receives the signals generated by the touch panel 31, and determines the type of the touch from the signals.

Figure 3:
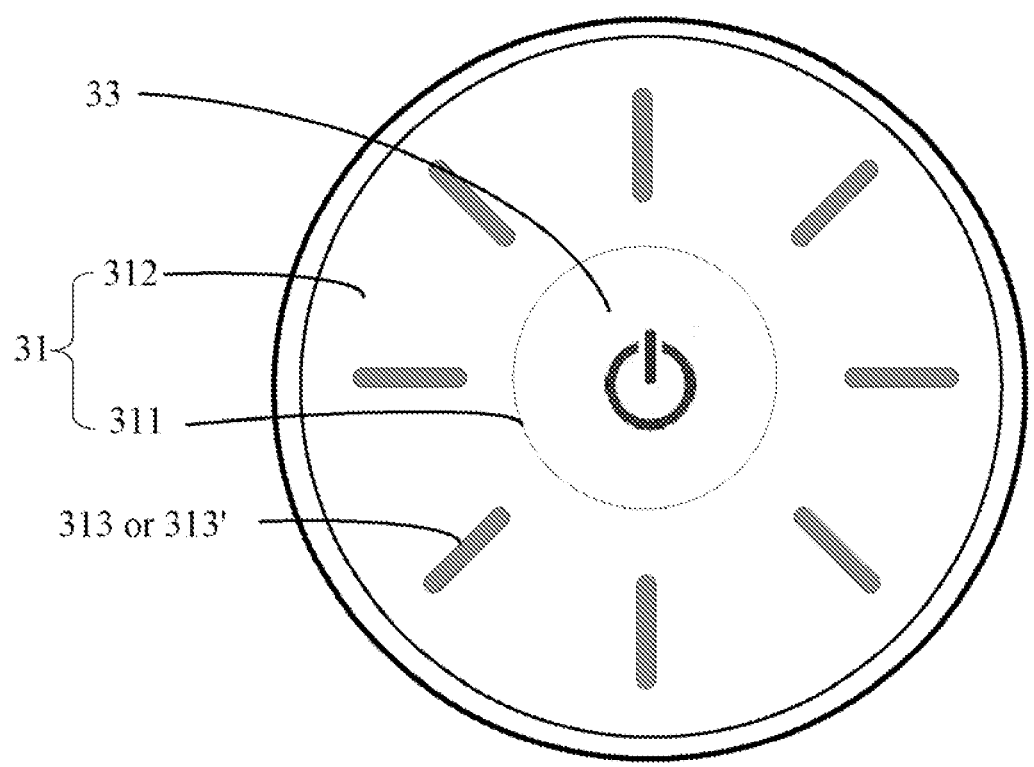
FIG. 3 is a schematic view of a switch apparatus of the lamp of FIG. 2.

Referring to FIG. 3, a schematic view of the switch apparatus 30 of the LED table lamp 100 of FIG. 2 is illustrated. The outer surface of switch apparatus 30 is circular. The touch panel 31 includes a first touch region 311 and a second touch region 312. The first and second touch regions 311, 312 include a number of touch sensors. The first touch region 311 is circular and is transparent or at least translucent. An indicator 33 is located under the first touch region 311 and is electrically connected to the printed circuit board (not shown) of the LED lamp 100. After the LED lamp 100 is first connected to the power supply, the indicator 33 gradually illuminates and then gradually darkens within a predetermined time period. The indicator 33 thus indicates to the user that the first touch region 311 must be touched to turn on the LED table lamp 100. This function has significant value during the night. In this embodiment, the indicator 33 is a white LED lamp, the predetermined time period is five seconds. Furthermore, when the user manipulates the touch panel 31, the microprocessor 20 controls the indicator 33 to flash or flicker as a feedback to the user. In other embodiments, the first touch region 311 can be other shapes such as rectangular, elliptical, star shaped, or moon shaped for example.

The second touch region 312 is annular and includes a number of stall marks 313 for indicating color temperatures. Each stall mark 313 is associated with a particular color temperature of the LED light source 50. In the embodiment, the second touch region 312 includes eight long strip-shaped stall marks 313 equally spaced from each other. In other embodiments, the number and the shape of the stall marks 313 can be designed according to actual need.

FIG. 4 shows the function table 12 stored in the storage unit 10 of the LED lamp 100 of FIG. 1, in accordance with the first embodiment. The working principle of the LED lamp 100 is illustrated with reference to FIGS. 2-4.

When the LED lamp 100 is first connected to the power supply, the power managing unit 60 supplies power to the microprocessor 20. The microprocessor 20 then controls the power managing unit 60 to supply power to the LED light source 50. For example, once the LED lamp 100 is connected to the power supply, the switch apparatus 30 is serially connected to, and interrupts, the power. The microprocessor 20 controls the indicator 33 to gradually illuminate and then darken, and this function is repeated until the first touch region 311 is touched for powering on the LED light source 50. The light from the LED light source 50 is also emitted from the first touch region 311 of the touch panel 31, thus highlighting the first touch region 311.

Then, if the first touch region 311 is tapped by a user (eg. the center of the first touch region 311 is tapped), the touch panel 31 generates signals in response to the tap of a fingertip. The touch controller 32 determines the type of the touch, that is, that the touch manner is a tap operation and that the touch position is in first touch region 311 according to the signals. In this embodiment, the touch controller 32 determines the type of the touch according to the duration of the signals and the position of the particular touch sensor generating the signals. The microprocessor 20 controls the indicator 33 to flash or flicker as a feed-back to the user, and determines the control function corresponding to the type of the touch as being a switching between the power on and the power off states of the LED light source 50, according to the function table 12 stored in the storage unit 10. The microprocessor 20 also controls the LED light source 50.

In this embodiment, if the microprocessor 20 detects that the power managing unit 60 is not supplying power to the LED light source 50, the microprocessor 20 determines the LED light source 50 is powered off. Responding to the touch operation corresponding to a switching between the power on and the power off states, the microprocessor 20 controls the LED light source 50 to lighten until the value of the brightness of the LED light source 50 becomes stable, that is to say, the illumination of the LED light source 50 is relatively slow. In an alternative embodiment, when the first touch region 311 is tapped, the microprocessor 20 controls the LED light source 50 to assume full brightness and stability immediately, that is to say, the illumination of the LED light source 50 is relatively fast.

If the microprocessor 20 detects that the power managing unit 60 is supplying power to the LED light source 50, the microprocessor 20 determines the LED light source 50 is in the power on state. Responding to a touch operation corresponding to a switching between the power on and the power off states, the microprocessor 20 controls the LED light source 50 to become darker to a predetermined value (eg. reduce the brightness to fifty percent) for a predetermined time period (eg. 10 seconds), and then cut off the power supply of the LED light source 50. Thus, some time is allowed for the user to collect belongings and exit the room with some illumination.

If the user slides his finger clockwise on the second touch region 312 of the touch panel 31, the touch panel 31 generates signals in response to the slide operation. The touch controller 32 determines the type of the touch, that is, that the touch manner is a slide operation and that the touch position is in the second touch region 312. If the touch controller 32 receives sequential signals from touch sensors of the second touch region 312 in a clockwise orientation within a time period, the touch controller 32 determines that the touch manner is a slide touch, and that the touch position is in the second touch region 312. The microprocessor 20 controls the indicator 33 to flash as feedback to the user, and determines that the control function corresponding to the type of the touch is to increase the brightness of the LED light source 50, according to the function table 12 stored in the storage unit 10. The microprocessor 20 also controls the LED light source 50 accordingly. In this embodiment, the increasing brightness of the LED light source 50 is directly proportional to the slide distance of the slide touch applied on the second touch region 312. In other words, the longer the slide distance, the greater the brightness of the LED light source 50 will be.

If the user slides his finger counterclockwise on the second touch region 312, the microprocessor 20 also controls the indicator 33 to flash as feedback to the user, and determines that the control function corresponding to the type of the touch is to decrease the brightness of the LED light source 50, according to the function table 12 stored in the storage unit 10. The working principles are similar to increasing the brightness of the LED light source 50, but in reverse. In an alternative embodiment, when the user slides clockwise on the second touch region 312, the microprocessor 20 decreases the brightness of the LED light source 50, and when the user slides counterclockwise on the second touch region 312, the microprocessor 20 increases the brightness of the LED light source 50.

If the user taps on one of the stall marks 313 on the second touch region 312, the touch panel 31 generates signals in response to the tap operation. The touch controller 32 determines the type of the touch according to the signals. That is, that the touch manner is a tap operation, and that the touch position is on a particular stall mark 313 of the second touch region 312. The microprocessor 20 also controls the indicator 33 to flash as feedback to the user. At the same time, the microprocessor 20 also determines that the control function corresponding to the type of the touch is the adjustment of the color temperature of the LED light source 50 to the particular value of color temperature which is associated with the particular stall mark 313, according to the function table 12 stored in the storage unit 10. The microprocessor 20 also controls the LED light source 50 accordingly. Thus, the user can adjust the color temperature of the LED light source 50. In this embodiment, the microprocessor 20 further controls the adjustment of the color temperature on a time basis. In other words, the longer the period of time spent in adjusting the color temperature, the larger the difference between the starting and ending values of the color temperatures will be.

A user can intelligently control the lamp 100 by touching the touch panel 31 of the switch apparatus 30. For example, the user can power on/off the LED light source 50 of the lamp 100 by tapping on the first touch region 311, adjust the brightness of the LED light source 50 and control the LED light source 50 to gradually illuminate or darken by sliding clockwise/counterclockwise on the second touch region 312, and adjust the value of the color temperature of the LED light source 50 to the particular value of the color temperature associated with a particular mark 313 by tapping on the stall mark 313 on the second touch region 312. Furthermore, the microprocessor 20 controls the indicator 33 under the first touch region 311 to flash as feedback visible to the user. The microprocessor 20 controls the indicator 33 to become darker during a predetermined time period, and then cuts off the power supply of the LED light source 50, which leaves some time for the user to pick up his belongings and leave the room. Compared to the conventional lamps using the key switch or the button switch, the lamp 100 is significantly more user-friendly and has improved reliability even after repeated use.

FIG. 4 shows the function table 12' stored in the storage unit 10 of the LED lamp 100 of FIG. 1, in accordance with the second embodiment. The differences between this embodiment and the first embodiment are illustrated with reference to FIGS. 1, 3 and 5.

1) In a second embodiment, a number of stall marks 313' are for adjusting brightness on the second touch region 312, not for adjusting color temperatures as in the first second embodiment. Each stall mark 313' is associated with a brightness of the LED light source 50. In the second embodiment, the second touch region 312 includes eight long strip-shaped stall marks 313' equally spaced from each other. In other embodiments, the number and the shape of the stall marks 313' can be designed according to actual need.

2) In another embodiment, when the touch controller 32 determines that the touch manner is a tap operation and that the touched position is on a particular stall mark 313' of the second touch region 312, the microprocessor 20 determines that the control function corresponding to the type of the touch is the adjustment of the brightness of the LED light source 50 to a value equal to the brightness associated with the particular stall mark 313', according to the function table 12' stored in the storage unit 10. The microprocessor 20 also controls the LED light source 50 accordingly.

3) In a second embodiment, when the touch controller 32 determines that the touch manner is sliding clockwise, and that the touched position is on the second touch region 312 of the touch panel 31, the microprocessor 20 determines that the control function corresponding to the type of the touch is an increase in the value of the color temperature of the LED light source 50, according to the function table 12' stored in the storage unit 10, and controls the LED light source 50 to execute this control function. In the second embodiment, the value of the increase of the color temperature of the LED light source 50 is directly proportional to the distance that the touch is slid on the second touch region 312. In other words, the longer the sliding distance, the greater will be the increase in value of the color temperature of the LED light source 50. Accordingly, if the user slides counterclockwise on the second touch region 312, the microprocessor 20 determines that the control function corresponding to the type of the touch is a decrease in the value of the color temperature of the LED light source 50, according to the function table 12' stored in the storage unit 10. The working principles are similar to increasing the color temperature of the LED light source 50, but in reverse. In an alternative embodiment, when the user slides clockwise on the second touch region 312, the microprocessor 20 decreases the color temperature of the LED light source 50, and when the user slides counterclockwise on the second touch region 312, the microprocessor 20 increases the color temperature of the LED light source 50.

In an alternative embodiment, the microprocessor 20 and the storage unit 10 are included in the switch apparatus 30.

Although the present disclosure has been specifically described on the basis of the embodiments thereof, the disclosure is not to be construed as being limited thereto. Various changes or modifications may be made to the embodiments without departing from the scope and spirit of the disclosure.

What is claimed is:

1. A lamp comprising:
   a lamp body;
   an LED light source fixed in the lamp body;
   a storage unit storing a function table recording the relationship between a plurality of types of touches and a plurality of control functions of the lamp, the type of the touches associated with touch manners and the positions of the touches;
   a switch apparatus fixed on the lamp body, the switch apparatus comprising:
      a touch panel, configured for generating operation signals in response to the touches applied on thereon, the touch panel comprising a first touch region and a second touch region, the first touch region is circular, the second touch region is an annular region surrounding the first touch region;
      a touch controller, configured for receiving the operation signals generated by the touch panel, and determining the type of the touch according to the operation signals; and
      an indicator located under the first touch region; and
   a microprocessor electrically connected to the switch apparatus and configured to switch between the power on and power off states of the LED light source in response to an operation applied on the first touch region, and configured to adjust the brightness of the LED light source in response to a first operation applied on the second touch region, and to adjust the color temperature of the LED light source in response to a second operation applied on the second touch region, according to the function table, and to control the indicator to flash when the touch panel is touched.

2. The lamp as described in claim 1, wherein:
   if the touch manner is a tap operation and the touch position is the first touch region, the associated control function is to switch between the power on and power off states of the LED light source;
   if the touch manner is a slide operation and the touch position is on the second touch region, the associated control function is to adjust the brightness of the LED light source; and
   if the touch manner is a tap operation and the touch position is on the second touch region, the associated control function is to adjust the color temperature of the LED light source.

3. The lamp as described in claim 2, wherein the brightness of the LED light source is directly proportional to the slide distance of the slide touch applied on the second touch region.

4. The lamp as described in claim 3, wherein the slide operation comprises sliding clockwise and sliding counterclockwise, if the touch manner is a sliding clockwise operation and the touch position is on the second touch region, the associated control function is to increase the brightness of the LED light source, and if the touch manner is a sliding counterclockwise operation and the touch position is on the second touch region, the associated control function is to decrease the brightness of the LED light source.

5. The lamp as described in claim 2, wherein the second touch region comprises at least two stall marks, one stall mark associates with a value of the color temperature of the LED light source, if one of the stall marks is tapped, the microprocessor is configured to adjust the value of the color temperature of the LED light source to the value of the color temperature associated with the tapped stall mark.

6. The lamp as described in claim 5, wherein if the microprocessor determines the control function is to switch the power on state with the power off state of the LED light source, the microprocessor is configured to control the indicator to become dark with a predetermined value of brightness for a predetermined time period, and then cut off the power supply of the LED light source.

7. The lamp as described in claim 5, wherein if the microprocessor determines the control function is to cut off the power supply of the LED light source, the microprocessor is configured to control the indicator to become dark with a predetermined value of brightness for a predetermined time period, and then cut off the power supply of the LED light source.

8. The lamp as described in claim 5, wherein the stall marks are set on the second touch region.

9. The lamp as described in claim 1, wherein:
   if the touch manner is a tap operation and the touch position is the first touch region, the associated control function is to switch between the power on and power off states of the LED light source;
   if the touch manner is a slide operation and the touch position is on the second touch region, the associated control function is to adjust the color temperature of the LED light source; and
   if the touch manner is a tap operation and the touch position is on the second touch region, the associated control function is to adjust the brightness of the LED light source.

10. The lamp as described in claim 9, wherein the slide operation comprises sliding clockwise and sliding counterclockwise, if the touch manner is a sliding clockwise operation and the touch position is on the second touch region, the associated control function is to increase the color temperature of the LED light source, and if the touch manner is a sliding counterclockwise operation and the touch position is on the second touch region, the associated control function is to decrease the color temperature of the LED light source.

11. The lamp as described in claim 9, wherein the second touch region comprises at least two stall marks, one stall mark associates with a value of the brightness of the LED light source, if one of the stall marks is tapped, the microprocessor is configured to adjust the value of the brightness of the LED light source to the value of the brightness associated with the tapped stall mark.

12. The lamp as described in claim 11, wherein when the microprocessor determines the control function is to switch the power on state with the power off state of the LED light source, the microprocessor is configured to control the indicator to become dark with a predetermined value of brightness for a predetermined time period, and then cuts off the power supply of the LED light source.

13. The lamp as described in claim 1, wherein if the lamp is connected to a power supply and the LED light source is not powered on, the microprocessor is configured to control the indicator to gradually illuminate and then gradually darken.

14. The lamp as described in claim 1, wherein the first region is a transparent or a translucent region.

\* \* \* \* \*